US008447348B2

(12) United States Patent
Erceg et al.

(10) Patent No.: US 8,447,348 B2
(45) Date of Patent: May 21, 2013

(54) CONFIGURABLE ANTENNA STRUCTURE AND APPLICATIONS THEREOF

(75) Inventors: Vinko Erceg, Cardiff by the Sea, CA (US); Arya Reza Behzad, Poway, CA (US); Brima B. Ibrahim, Aliso Viejo, CA (US); David Rosmann, Irvine, CA (US); John Walley, Ladera Ranch, CA (US); Jeyhan Karaoguz, Irvine, CA (US); Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 747 days.

(21) Appl. No.: 12/328,597

(22) Filed: Dec. 4, 2008

(65) Prior Publication Data
US 2009/0081965 A1 Mar. 26, 2009

Related U.S. Application Data (63) Continuation-in-part of application No. 11/527,959, filed on Sep. 27, 2006, now abandoned, and a continuation-in-part of application No. 11/648,826, filed on Dec. 29, 2006, now Pat. No. 7,893,878.

(51) Int. Cl.
*H04M 1/00* (2006.01)
(52) U.S. Cl.
USPC ............... 455/552.1; 455/90.2; 455/168.1; 342/374; 343/876

(58) Field of Classification Search
USPC ............... 455/90.2, 550.1, 168.1, 121, 125, 455/176.1, 180.1, 188.1, 552.1, 553.1, 272, 455/273, 129, 193.2; 343/876, 700 R, 904, 343/858, 854, 814, 768
See application file for complete search history.

(56) References Cited

U.S. PATENT DOCUMENTS

| | | | | |
|---|---|---|---|---|
| 2003/0219035 A1* | 11/2003 | Schmidt | ............ | 370/478 |
| 2004/0063412 A1* | 4/2004 | Kim et al. | ............ | 455/226.2 |
| 2005/0111449 A1* | 5/2005 | Moorti et al. | ............ | 370/389 |
| 2005/0179614 A1* | 8/2005 | Nagy | ............ | 343/909 |
| 2006/0050007 A1* | 3/2006 | Min | ............ | 343/876 |
| 2006/0109191 A1* | 5/2006 | Shtrom et al. | ............ | 343/795 |
| 2006/0281423 A1* | 12/2006 | Caimi et al. | ............ | 455/129 |
| 2007/0273606 A1* | 11/2007 | Mak et al. | ............ | 343/876 |

* cited by examiner

*Primary Examiner* — Chuong A Ngo
(74) *Attorney, Agent, or Firm* — Garlick & Markison; Kevin L. Smith (57) ABSTRACT

A configurable antenna structure includes a plurality of switches, a plurality of antenna components, and a configuration module. The configuration module is operable to configure the plurality of switches and the plurality of antenna components into a first antenna for receiving a MFBMS signal. The configuration module continues processing by identify a signal component of interest of a plurality of signal components of interest within the MFBMS signal. The configuration module continues processing by configuring the plurality of switches and the plurality of antenna components into a second antenna.

23 Claims, 9 Drawing Sheets

FIG. 12
configured antenna 90

FIG. 13
configured antenna 90
configured antenna 92

CONFIGURABLE ANTENNA STRUCTURE AND APPLICATIONS THEREOF

This patent application is claiming priority under 35 USC §120 as a continuation-in-part patent application of patent application entitled MULTIPLE BAND ANTENNA STRUCTURE, having a filing date of Sep. 27, 2006, and a Ser. No. 11/527,959, now abandoned, and patent application entitled INTEGRATED CIRCUIT ANTENNA STRUCTURE having a filing date of Dec. 29, 2006, and a Ser. No. 11/648,826, now issued as U.S. Pat. No. 7,893,878, on Feb. 22, 2011.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communication systems and more particularly to antennas used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Since the wireless part of a wireless communication begins and ends with the antenna, a properly designed antenna structure is an important component of wireless communication devices. As is known, the antenna structure is designed to have a desired impedance (e.g., 50 Ohms) at an operating frequency, a desired bandwidth centered at the desired operating frequency, and a desired length (e.g., ¼ wavelength of the operating frequency for a monopole antenna). As is further known, the antenna structure may include a single monopole or dipole antenna, a diversity antenna structure, the same polarization, different polarization, and/or any number of other electromagnetic properties.

One popular antenna structure for RF transceivers is a three-dimensional in-air helix antenna, which resembles an expanded spring. The in-air helix antenna provides a magnetic omni-directional mono pole antenna, but is generally not implemented on a printed circuit board (PCB). For PCB implemented antennas, the antenna has a meandering pattern on one surface of the PCB. Such an antenna consumes a relatively large area of the PCB. For example, a ¼ wavelength antenna at 900 MHz has a total length of approximately 8 centimeters (i.e., 0.25*32 cm, which is the approximate wavelength of a 900 MHz signal). As another example, a ¼ wavelength antenna at 2400 MHz has a total length of approximately 3 cm (i.e., 0.25*12.5 cm, which is the approximate wavelength of a 2400 MH signal). Even with a tight meandering pattern, a single 900 MHz antenna consumes approximately 4 cm.

If an RF transceiver is a multiple band transceiver (e.g., 900 MHz and 2400 MHz) that supports multiple standards, then two antennas are needed, which consumes even more PCB space. With a never-ending push for smaller form factors with increased performance (e.g., multiple frequency band multiple standard [MFBMS] operation), current antenna structures are not practical for many newer wireless communication applications.

Therefore, a need exists for a multiple frequency band multiple standard antenna structure that at least partially overcomes one or more of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
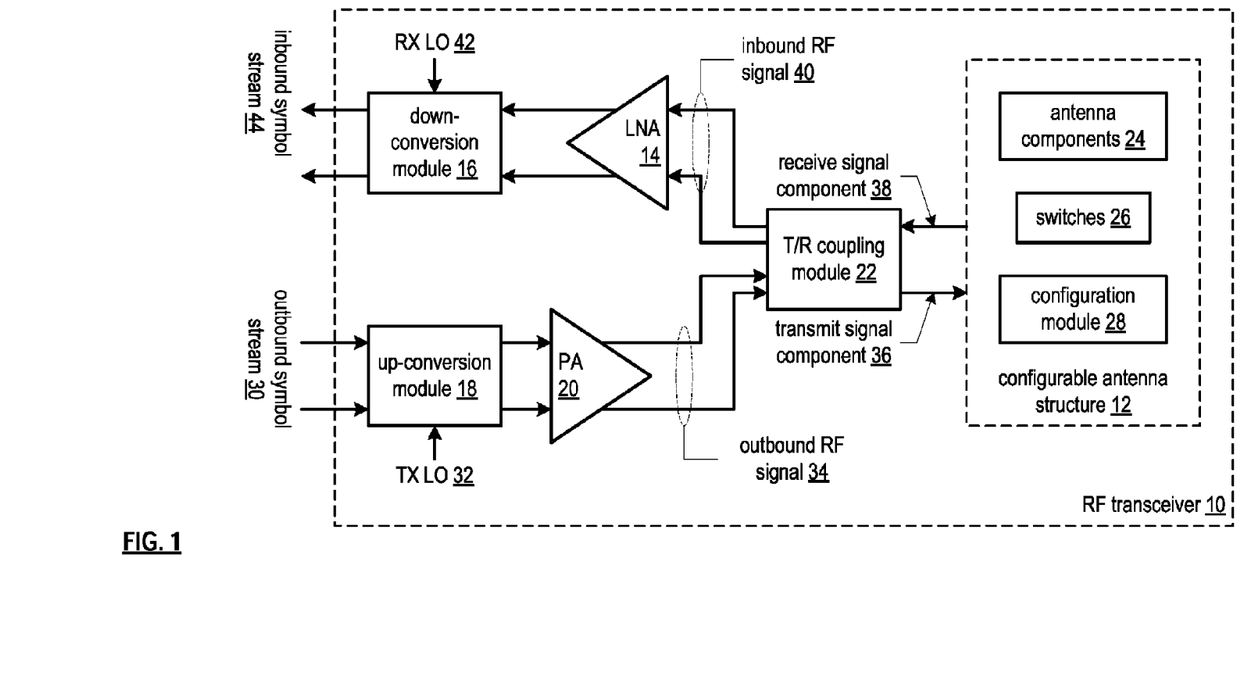
FIG. 1 is a schematic block diagram of an embodiment of a radio frequency (RF) transceiver in accordance with the present invention.

FIG. 1 is a schematic block diagram of an embodiment of a radio frequency (RF) transceiver 10 that includes a configurable antenna structure 12, a low noise amplifier module 14, a down conversion module 16, an up conversion module 18, a power amplifier module 20 and a transmit/receive coupling module 22. The configurable antenna structure 12 includes a plurality of antenna components 24, a plurality of switches 26 and a configuration module 28.

As an example of operation, the RF transceiver 10 is coupled to a baseband processing module within a wireless communication device to participate in one or more wireless communications, which is/are in compliance with one or more standards in one or more frequency bands. For example, one or more standards may operation in the 900 MHz frequency band, the 1800/1900 MHz frequency band, the 2100 MHz frequency band, the 2.4 GHz frequency band, the 5 GHz frequency band, the 29 GHz frequency band, the 60 GHz frequency band, etc. For instance, IEEE802.11 based standards operate in the 2.4 GHz frequency band (e.g., 2.412-2.483 GHz) and/or the 5 GHz frequency band (e.g., 5.15-5.35 GHz and 5.725-5.825 GHz); frequency division duplex (FDD) WCDMA operates in the 1900 MHz and 2100 MHz frequency bands (e.g., 1920-1980 MHz for uplink communications and 2110-2170 MHz for downlink communications); time division duplex (TDD) WCDMA operates the 1900 and 2100 MHz frequency bands (e.g., 1900-1920 MHz and 2010-2025 MHz, which are shared by the uplink and downlink communications); high-speed downlink packet access (HSDPA), high-speed uplink packet access (HSUPA) operate in same frequency band as WCDMA; a satellite based standards operate in the C-band (e.g., 500 MHz to 1 GHz) and/or the K-band (e.g., 12 GHz to 18 GHz); GSM based standards operate in the 900 MHz frequency band (e.g., up link 880-915 MHz and down link 925-960 MHz), the 1800 MHz frequency band (e.g., up link 1710-1785 MHz and down link 1805-1880 MHz), and/or the 1900 MHz frequency band (e.g., up link 1850-1910 MHz and down link 1930-1990 MHz); Enhanced Data rates for GSM Evolution (EDGE) based standards operate in the 900 MHz, 1800 MHz, and/or 1900 MHz frequency bands; and General Packet Radio Service (GPRS) based standards operate in the 900 MHz, 1800 MHz, and/or 1900 MHz frequency bands.

The baseband processing module, the RF transceiver 10, and/or the configurable antenna structure 12 are configured to support an active wireless communication, or communications, in accordance with the particular standard, or standards. For instance, if the wireless communication device is currently active in only a GSM based communication in the 1800/1900 MHz frequency band, then the baseband processing module, the RF transceiver 10, and/or the configurable antenna structure are configured for GSM operation in the 1800/1900 MHz frequency band.

In this configuration, the baseband processing module converts outbound data (e.g., voice, data, video, audio, text, graphics, etc.) into an outbound symbol stream 30 in accordance with the GSM standard(s). The up-conversion module 18 converts the outbound symbol stream 30 into an up converted signal in accordance with the corresponding standard. This may be done by mixes the outbound symbol stream 30 with a transmit local oscillation (which has been configured or selected from a plurality of oscillators to provide a desired local oscillation) to produce the up-converted signal. The mixing may be done in a variety of ways. For instance, a first mixer (which is tuned or selected from a plurality of mixers for the given frequency band or portion thereof) mixing an in-phase component of the outbound symbol stream 30 with in-phase component of the transmit local oscillation to produce a first mixed signal and a second mixer (which is tuned or selected from a plurality of mixers for the given frequency band or portion thereof) mixing a quadrature component of the outbound symbol stream 30 with a quadrature component of the transmit local oscillation to produce a second mixed signal. The first and second mixed signals are combined and/or filtered to produce the up-converted signal.

In another embodiment, the outbound symbol stream 30 includes phase information (e.g., +/−Δθ [phase shift] and/or θ(t) [phase modulation]) that adjusts the phase of the transmit local oscillation 32 to produce a phase adjusted up-converted signal. In this embodiment, the phase adjusted up-converted signal provides the up-converted signal. In another embodiment, the outbound symbol stream 30 further includes amplitude information (e.g., A(t) [amplitude modulation]), which is used to adjust the amplitude of the phase adjusted up converted signal to produce the up-converted signal. In yet another embodiment, the outbound symbol stream 30 provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In yet another embodiment, the outbound symbol stream further includes amplitude information, which is used to adjust the amplitude of the frequency adjusted up-converted signal to produce the up-converted signal. In a further embodiment, the outbound symbol stream 30 provides amplitude information (e.g., +/−ΔA [amplitude shift] and/or A(t) [amplitude modulation) that adjusts the amplitude of the transmit local oscillation to produce the up-converted signal.

The power amplifier module 20 amplifies the up converted signal to produce the transmit signal component of interest 36. The power amplifier module 20 may include one or more power amplifiers and/or power amplifier drivers coupled in series and/or in parallel to amplify the up-converted signal. Such a combination of power amplifiers and/or power amplifier drivers may be adjustable to operate with the given frequency band or portion thereof. Alternatively or in addition to, the power amplifier module may include a plurality of power amplifiers or drivers having different performance characteristics (e.g., gain, frequency response, bandwidth, etc.) that may be individually selected or selected in combination to amplify the up converted signal to produce an outbound RF signal 34.

The transmit/receive (T/R) module 22 provides the outbound RF signal 34 as the transmit signal component of interest 36 to the configurable antenna structure 12. The transmit/receive module 22 may include a transmit/receive switch when the configurable antenna structure is shared between the transmit and receive paths. The T/R module 22 may include one or more transformer baluns to convert single-ended signals into differential signals and/or convert differential signals into signal ended signals. The T/R module 22 may include one or more RF bandpass filters for filtering the outbound RF signal 34 and/or the inbound RF signal 40. In other embodiments, the T/R module 22 may include a plurality of T/R switches, transformer baluns, RF bandpass filters, and/or other components to provide a plurality of interfaces between the PA module 20 and the configurable antenna structure 12 to support a plurality of concurrent wireless communications.

The configurable antenna structure 12 is configured to provide an antenna for transmitting the transmit signal component 36 of interest 36. In this example, the antenna is configured to have antenna properties (e.g., gain, bandwidth, center frequency, etc.) to effectively transmit GSM signals. In this example, the configurable antenna structure 12 is further configured to provide a receive antenna having properties to effectively receive a GSM signal, which is provided as a receive signal component of interest 38 to the T/R coupling module 22.

Figure 2:
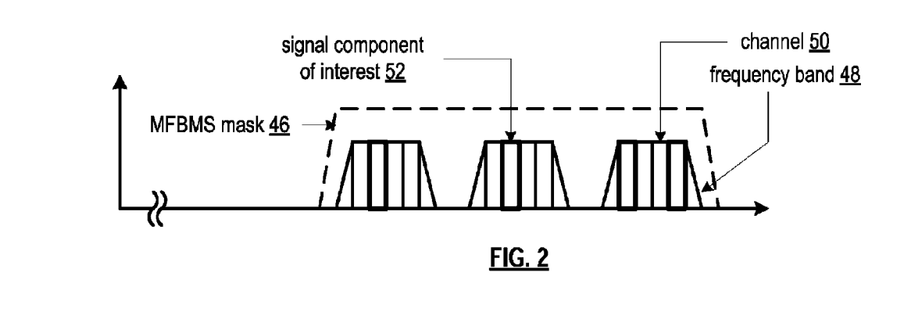
FIG. 2 is a diagram of an example of a multiple frequency band multiple standard (MFBMS) in accordance with the present invention.

To configure the configurable antenna structure 12, the configuration module 28 is operable to identify a signal component of interest 36 and/or 38 of a plurality of signal components of interest. The plurality of signal components corresponds to a plurality of standards that are within a multiple frequency band multiple standard (MFBMS) mask 46. With reference to FIG. 2, a MFBMS mask 46 corresponds to the total bandwidth of frequency bands 48 that are used for the various standards supported by the wireless communication device. Each frequency band (e.g., 900 MHz, 1800 MHz, 2.4 GHz, 5 GHz, satellite frequency band, 29 GHz, 60 GHz etc.) includes one or more channels 50. A signal component of interest 52 may be supported by one or more channels 50. For example, the GSM use of the 1800 MHz frequency band includes an up link channel at 1710-1785 MHz and a down link channel at 1805-1880 MHz.

Returning to the discussion of FIG. 1, the configuration module 22 may be a separate processing module or included in the baseband processing module. Such a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-20.

The configuration module 28 may identify the transmit signal component of interest 36 and/or receive signal component of interest 38 based on knowing the particular standard currently being utilized (e.g., GSM, WCDMA, EGDE, etc.). When the particular standard is not yet known (e.g., when the wireless device is the target of a communication and not the initiator), the configuration module 28 may configure the plurality of antenna components 24 via the switches to provide a first antenna. The first antenna may have antenna properties corresponding to the MFBMS mask 46 such that the RF transceiver can receive a very wide bandwidth signal (e.g., that spans the MFBMS mask 46). The configured antenna provides the received MFBMS signals to the LNA and down conversion module for conversion into baseband signals. The baseband signals are interpreted by the configuration module 28 and/or the baseband processing module to determine whether the wireless communication device is a target of a wireless communication. If so, the configuration module 28 and/or the baseband processing module identifies the standard, the corresponding frequency band, and the corresponding channel or channels (i.e., the signal component(s) of interest).

In another embodiment, the configuration module 28 configures the plurality of antenna components to form a plurality of antennas for scanning the MFBMS mask 46. Each of the plurality of antennas has a bandwidth narrower than the bandwidth of the MFBMS mask 46 and has a different center frequency than the other antennas. The plurality of antennas may be configured in parallel, in a serial manner, or in a combination thereof. The configuration module 28 may further adjust the properties from antenna to antenna to obtain various scanning options.

After identifying the signal component, or components of interest 36 and/or 38, the configuration module 28 configures the plurality of switches 26 and the plurality of antenna components 24 into an antenna for transmitting or receiving the signal component of interest 36 and/or 38. The configuration module 28 may provide control signals to the switches 26 and antenna components 24 to configure them to provide the desired antenna. The control signals may be provided to all of the switches 26 and antenna components 24 or to only those switches and antenna components 24 needed to provide the desired antenna.

The desired antenna receives an inbound RF signal of interest (e.g., an inbound GSM signal) and provides it to the T/R coupling module 22. The T/R coupling module 22 may filter the received signal, may converted it into a differential signal, and/or may provide the received signal to the LNA module 14 and an inbound RF signal 40. The LNA module 14 may include one or more low noise amplifiers to amplify the inbound RF signal 40 to produce an amplified inbound RF signal. To accommodate the wide bandwidth of an MFBMS signal (i.e., an signal that fits within the MFBMS mask 46 of FIG. 2), the LNA module 14 may include one or more adjustable LNA modules (e.g., adjustable gains, bandwidth, frequency response, etc.), may include a plurality of narrow band LNA modules (e.g., tuned to one or more channels or frequency bands) coupled to process the wide bandwidth MFBMS signal, and/or a combination thereof.

The down conversion module 16 converts the amplified received signal component of interest (i.e., the amplified inbound RF signal 40) into an inbound symbol stream 44 in accordance with a corresponding standard of the plurality of standards. The down conversion may be done by mixing (which is tunable or selectable from a plurality of mixers based on the frequency band in which the signal component of interest lies) in-phase (I) and quadrature (Q) components of the amplified inbound RF signal with in-phase and quadrature components of receiver local oscillation 42 (which is adjustable or selectable from a plurality of oscillators based on the frequency band in which the signal component of interest lies) to produce a mixed I signal and a mixed Q signal for each component of the amplified inbound RF signal. The mixed I and Q signals are combined to produce an inbound symbol stream 44. In an embodiment, the inbound symbol stream 44 includes phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the inbound RF signal includes amplitude information (e.g., +/−ΔA [amplitude shift] and/or A(t) [amplitude modulation]). To recover the amplitude information, the down conversion module further includes an amplitude detector such as an envelope detector, a low pass filter, etc.

As another example, if the wireless communication device is currently active in two or more wireless communications (e.g., a GSM based communication in the 1800/1900 MHz frequency band and in a 60 GHz based communication), the baseband processing module, the RF transceiver 10, and/or the configurable antenna structure 12 are configured to support both communications concurrently. With respect to the configurable antenna structure 12, the configuration module 28 identifies a signal component of interest 36 and/or 38 of a plurality of signal components of interest for each wireless communication.

After identifying the signal component, or components of interest 36 and/or 38, the configuration module 28 configures the plurality of switches 26 and the plurality of antenna components 24 into an antenna for transmitting or receiving the signal component of interest 36 and/or 38 for one wireless communication and into another antenna for transmitting or receiving the signal components of interest for another wireless communication. The configuration module 28 may provide control signals to the switches 26 and antenna components 24 to configure them to provide the desired antennas. The control signals may be provided to all of the switches 26 and antenna components 24 or to only those switches and antenna components 24 needed to provide the desired antenna.

As yet another example, when the wireless communication device is idle (i.e., not actively participating in a wireless communication), the antenna structure 12 may be configured into a first antenna that has a bandwidth corresponding to the MFBMS mask 46 or a default frequency band within the MFBMS mask 46. In this instance, the RF transceiver 10 is in a sniff mode to detect signal activity in any one of the frequency bands for any one of the standards. Once signal activity is detected and is for the wireless communication device, the RF transceiver 10, including the configurable antenna structure 12, is configured as discussed above.

Figure 3:
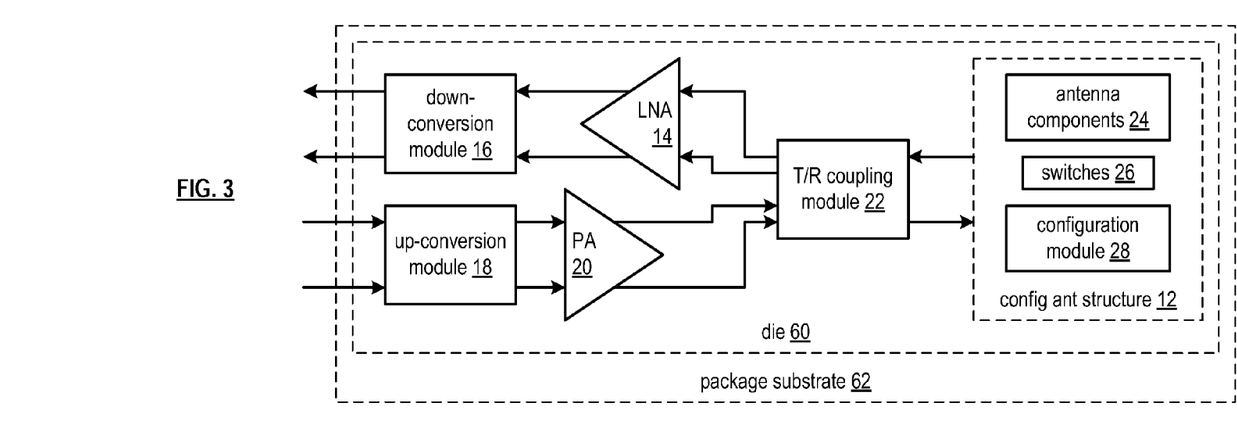
FIG. 3 is a schematic block diagram of another embodiment of a radio frequency (RF) transceiver in accordance with the present invention.

FIG. 3 is a schematic block diagram of another embodiment of a radio frequency (RF) transceiver 10 that includes a die 60 and a package substrate 62. The package substrate 62 supports the die 60 and is mounted in an integrated circuit package. The die 60 supports the configurable antenna structure 12, the T/R coupling module 22, the PA module 20, the LNA module 14, the down conversion module 16, and the up conversion module 18. In this embodiment, additional switches 26 and antenna components 24 may be off-chip and mounted on a printed circuit boards (PCB). For example, physically larger antenna components 24 may be provided off-chip than the ones included on the die 60 to enable larger antennas, which typically have a lower center frequency than smaller antennas, to be configured.

Figure 4:
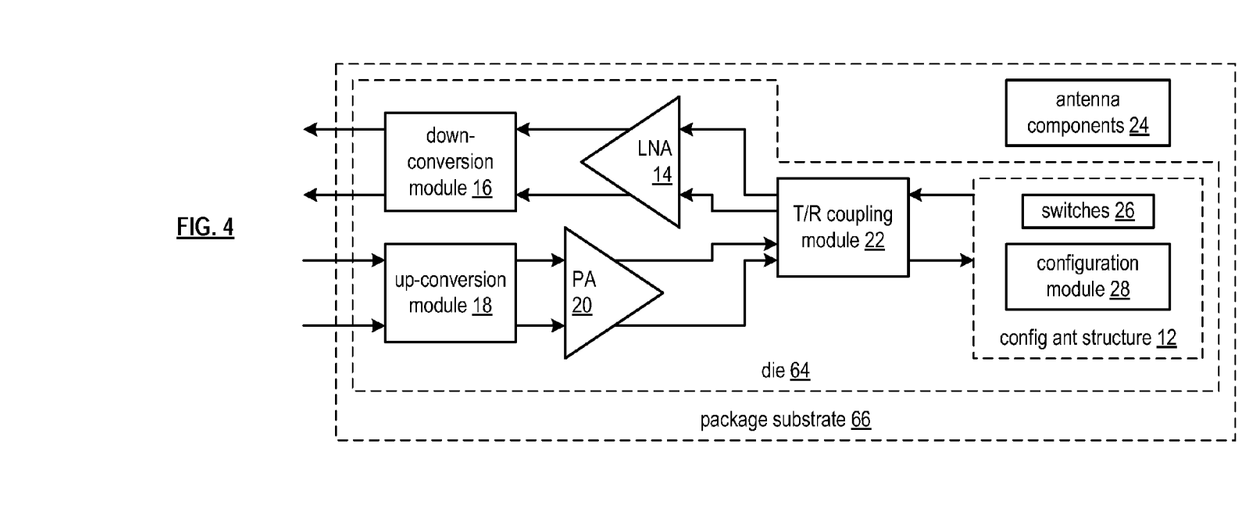
FIG. 4 is a schematic block diagram of another embodiment of a radio frequency (RF) transceiver in accordance with the present invention.

FIG. 4 is a schematic block diagram of another embodiment of a radio frequency (RF) transceiver 10 that includes a die 64 and a package substrate 66. The package substrate 66, is mounted in an integrated circuit package, supports the die 64 and the antenna components 24. The die 64 supports the configuration module 28, the switches 26, the T/R coupling module 22, the PA module 20, the LNA module 14, the down conversion module 16, and the up conversion module 18. In this embodiment, additional switches 26 may be on the package substrate 66. In addition, more antenna components 24 and switches may be off-chip and mounted on a printed circuit boards (PCB) to allow for physically larger antenna configurations.

Figure 5:
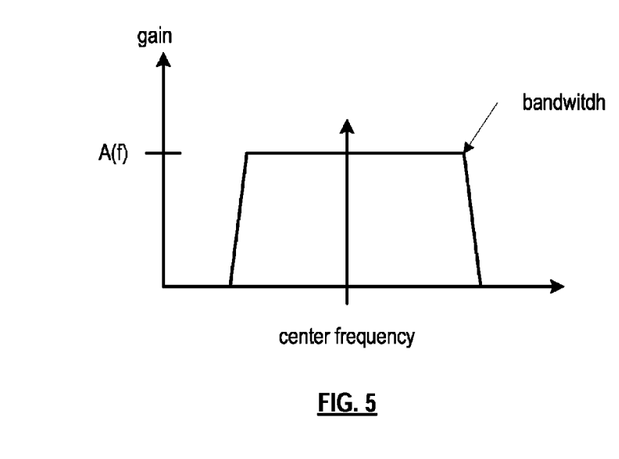
FIGS. 5-7 are diagrams of examples of adjustable properties of a configurable antenna structure in accordance with the present invention.

FIG. 5 illustrates an example of frequency response of a configured antenna. The frequency response includes a gain, which may fixed (A) or adjustable [A(f)], a center frequency, and a bandwidth. The center frequency, which corresponds to the resonant frequency of the antenna, is primarily determined by the length of the antenna (λ=c/f, where λ is the wave length, c is the speed of light, and f is the resonant frequency). As such, the antenna components may be configured to provide an antenna that has a specific length to provide a desired center, or resonant, frequency. Alternatively, the antenna components may be configure to provide a length that is a fraction of the length of the desired frequency such that the antenna resonates at a harmonic frequency, or frequencies, of the desired frequency. Further, the antenna components may be configured to provide multiple resonant frequencies, which enable the antenna to be effective over a wide range of frequencies.

The gain of an antenna is generally defined as the ratio of the intensity, which is a function of per unit surface, radiated by the antenna in a given direction at a distance divided by the intensity radiated at the same distance by a hypothetical isotropic antenna. As such, by configuring the antenna components in a way that affects the per unit surface of the antenna, the gain of the antenna can be set, or adjusted.

The bandwidth of an antenna having a length of ½ wavelength or less is primarily dictated by the antenna's quality factor (Q), which may be mathematically expressed as shown in Eq. 1 where $v_0$ is the resonant frequency, $2\delta v$ is the difference in frequency between the two half-power points (i.e., the bandwidth).

$$\frac{v_0}{2\partial v} = \frac{1}{Q} \quad \text{Equation 1}$$

Equation 2 provides a basic quality factor equation for the antenna structure, where R is the resistance of the antenna structure, L is the inductance of the antenna structure, and C is the capacitor of the antenna structure.

$$Q = \frac{1}{R} * \sqrt{\frac{L}{C}} \quad \text{Equation 2}$$

As such, by adjusting the resistance, inductance, and/or capacitance of an antenna structure, the bandwidth can be controlled.

Figure 6:
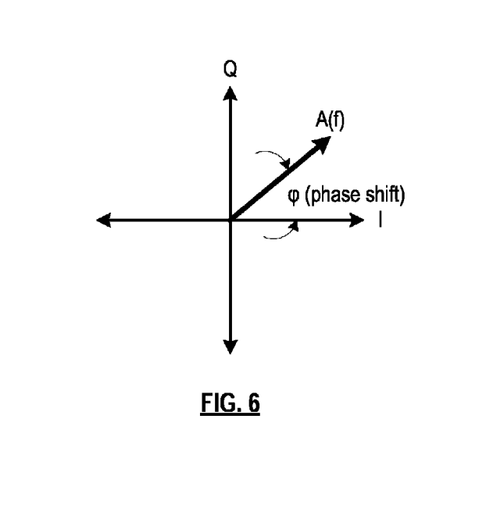

FIG. 6 illustrates an example of phase shifting a signal transmitted or received by a configured antenna. In this instance, the transmitted or received signal is represented by the term [A(f)], which may be rotated in phase by a $\phi$ (phase shift) value. In an embodiment, the antenna components 24 include one or more phase shifters that phase shift a transmitted or received signal.

Figure 7:
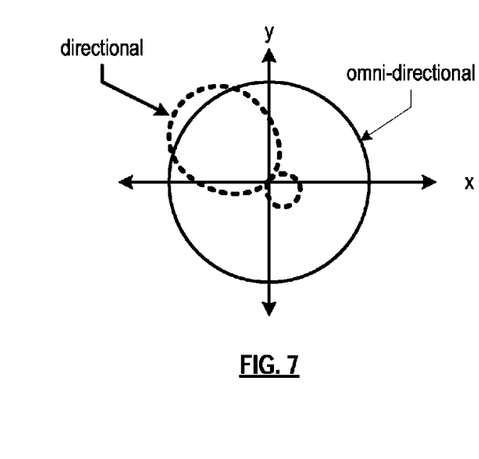

FIG. 7 illustrates an example of an antenna's directional capabilities. As shown, an antenna may be omni-directional or directional. As such, the antenna components may be configured to provide an antenna that has a directional radiation pattern or one that has a more omni-directional radiation pattern.

Figure 8:
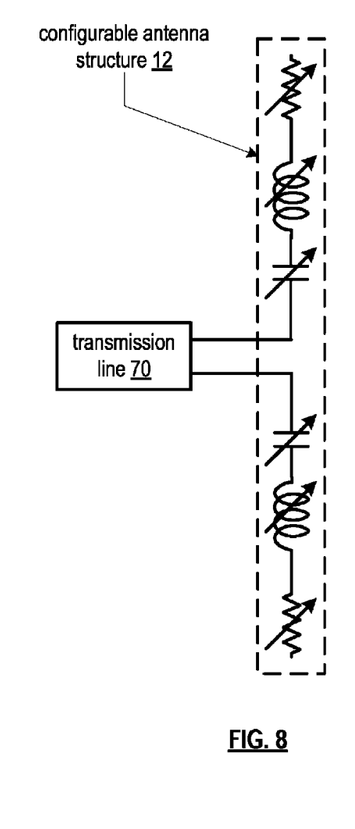
FIG. 8 is a schematic block diagram of an embodiment of a configurable antenna in accordance with the present invention.

FIG. 8 is a schematic block diagram of an embodiment of a configurable antenna structure 12 coupled to a transmission line 70. In this diagram, the antenna components may be configured in a variety of ways to provide a desired resistance, inductance, and/or capacitance. From configuration to configuration, the resistance, inductance, and/or capacitance may be changed to affect one or more properties of a configured antenna. As such, the configurable antenna structure 12 can be configured to provide an antenna, or antennas, for a desired level of operation for one or more standards in one or more frequency bands.

Figure 9:
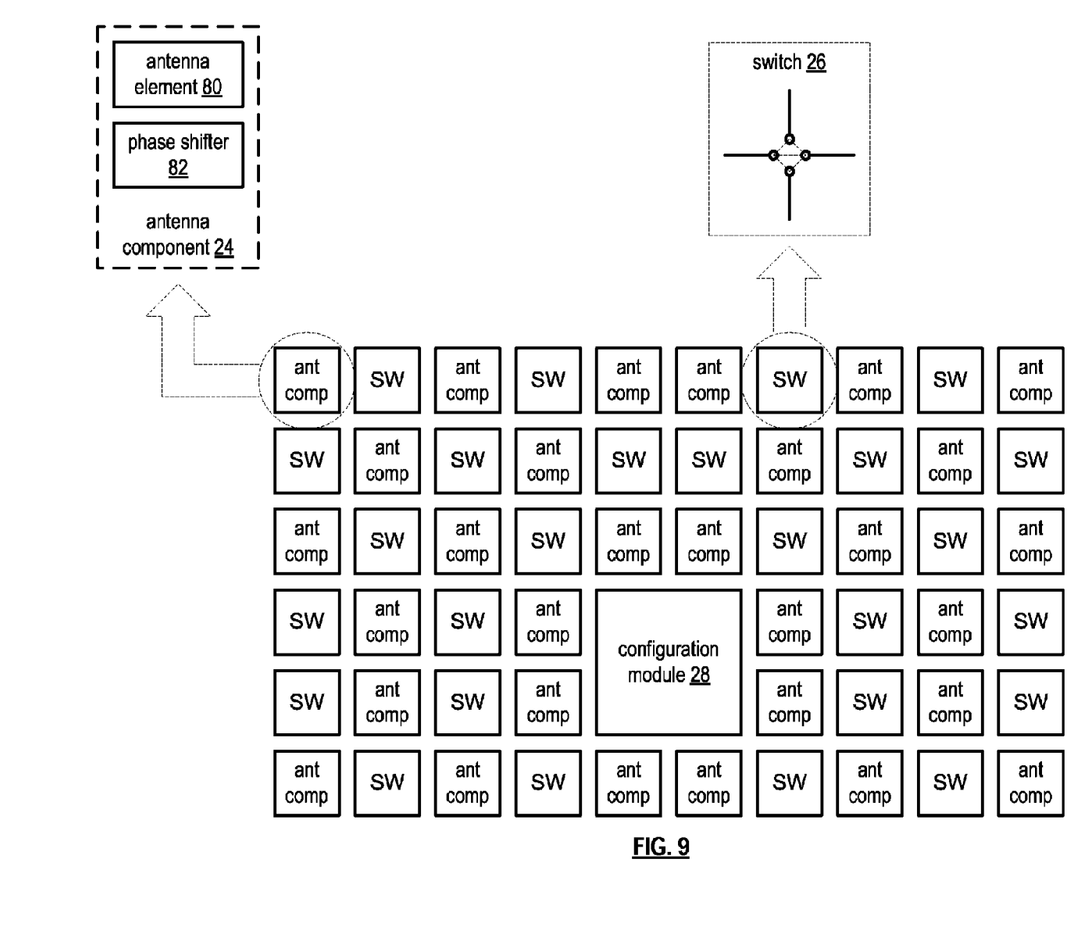
FIG. 9 is a diagram of an embodiment of a configurable antenna in accordance with the present invention.

FIG. 9 is a diagram of an embodiment of a configurable antenna structure 12 that includes a plurality of antenna components 24 (ant comp) and a plurality of switches 26 (SW). The antenna components 24 and the switches 26 may be implemented on one or more dies of an integrated circuit. On a die, the antenna components 24 and switches may be arranged in a series of rows and columns, or other patterns to provide various options for configuring antennas having desired properties.

As shown, an antenna component 24 may include an antenna element 80 and/or a phase shifter 82. The antenna element may 80 be a trace of a specific geometric shape (e.g., square, rectangle, right angle, arc, etc.) having a length, width, and depth to provide, at a frequency, a resistance, inductance, and/or capacitance. Note that the capacitance is with respect to another antenna component or antenna element.

A phase shifter 82 may be a trace that is inductively and/or capacitively coupled to an antenna element, or elements, that changes the phase of the transmitted or received signal. In another embodiment, the phase shifter 82 may include a capacitor, an inductor, a transistor, and/or resistor to phase shift a received or transmitted signal. In yet another embodiment, the phase shifter 82 may be a circuit (e.g., filter, integrator, differentiator, etc.) that shifts the phase of a transmitted or received signal.

A switch 26 of the plurality of switches may include a plurality of connection lines and a plurality of switches that connect one of the connection lines to another. With the switches 26 distributed among the antenna components 24, the antenna components may be coupled together to provide a variety of configured antennas. Note that a switch 26 may have more or less than the four connect lines shown.

Figure 10:
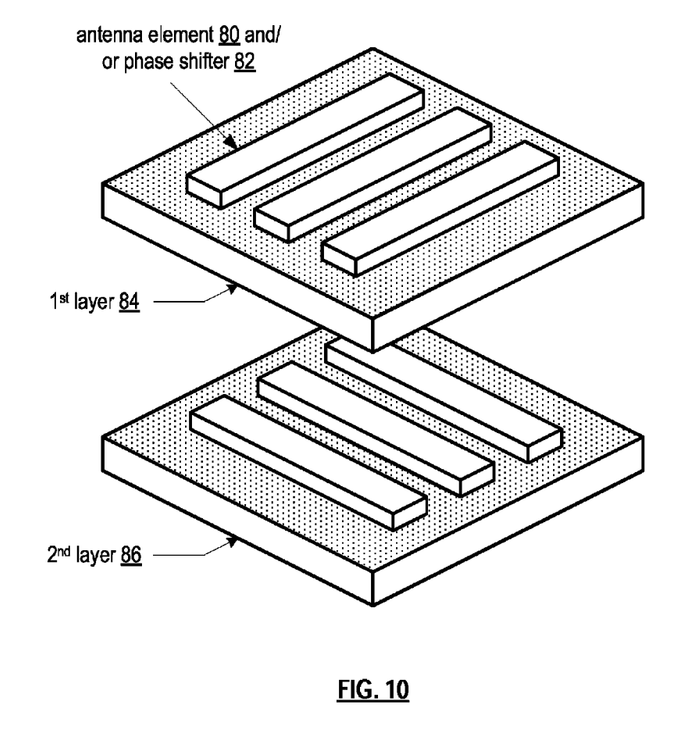
FIG. 10 is a diagram of an embodiment of an antenna component in accordance with the present invention.

FIG. 10 is a diagram of an embodiment of an antenna component 24 that includes a plurality of antenna elements 80 and/or a plurality of phase shifters 82 on one or more layers 84 and/or 86 of an integrated circuit, package substrate, printed circuit board, and/or other substrate. Multiple elements and/or shifters on a layer allows for various combinations within an antenna component to affect the antenna properties of the antenna component. For instance, an individual antenna element 80 has a higher resistance, greater inductance, and less surface area, than two or three elements 80 used in parallel, which affects the antenna properties of the component 24. Also, a single antenna element is further away from a single antenna element of another antenna component, which yields a low capacitance therebetween than when multiple antenna elements are coupled in parallel.

In this embodiment, the antenna elements 80 and/or phase shifters 82 on the first layer 84 are perpendicular to the antenna elements 80 and/or phase shifters 82 on the second layer 86. Such a configuration allows for one layer or the other to be used to provide "vertical" or "horizontal" connectivity to other antenna components 24. For instance, by varying the vertical and horizontal connections, a wide variety of antennas may be configures. Examples of this are shown in FIGS. 12-16.

Figure 11:
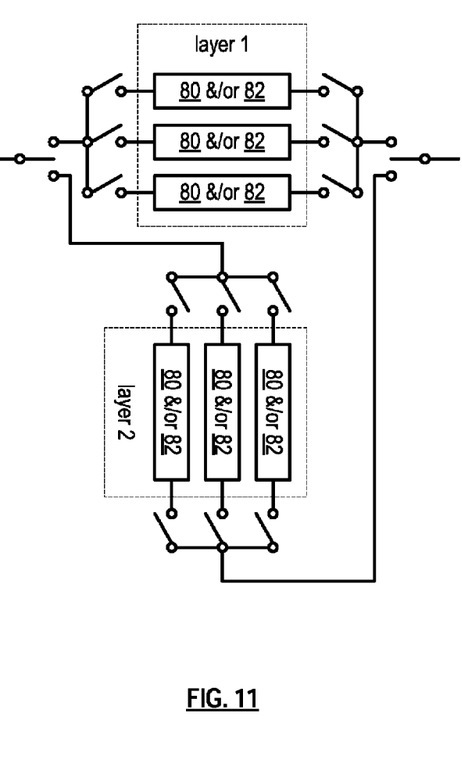
FIG. 11 is a schematic block diagram of an embodiment of an antenna component in accordance with the present invention.

FIG. 11 is a schematic block diagram of an embodiment of an antenna component 24 that includes multiple antenna elements 80 and/or phase shifters 82 one multiple layers. The antenna component 24 may also include a plurality of high frequency switches that allow for the various elements to be individually selected or coupled in parallel. Note that in other embodiments, an antenna component 24 may include a single antenna element 80 or a single phase shifter 82 and not include any switches.

Figure 12:
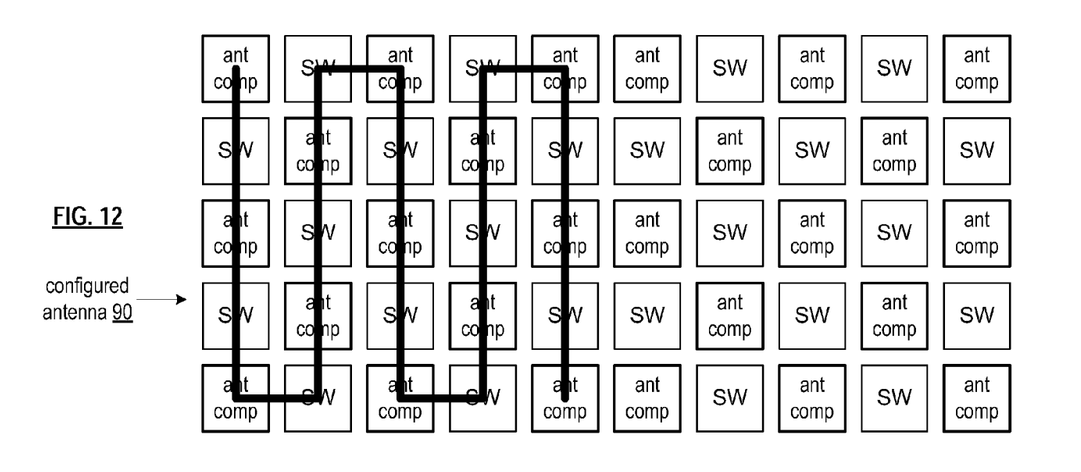
FIG. 12 is a diagram of an example of a configured antenna in accordance with the present invention.

FIG. 12 is a diagram of an example of a configured antenna 90 that includes a meandering pattern. In this example, multiple antenna components are coupled together via switches to provide the meandering pattern. The length of the antenna is dependent upon the frequency of operation. Other antenna properties are dependent upon the properties of the configured antenna components 24. In one implementation, the antenna is configured for a single frequency band, or portion thereof. In another implementation, the antenna is configured for multiple frequency bands.

Figure 13:
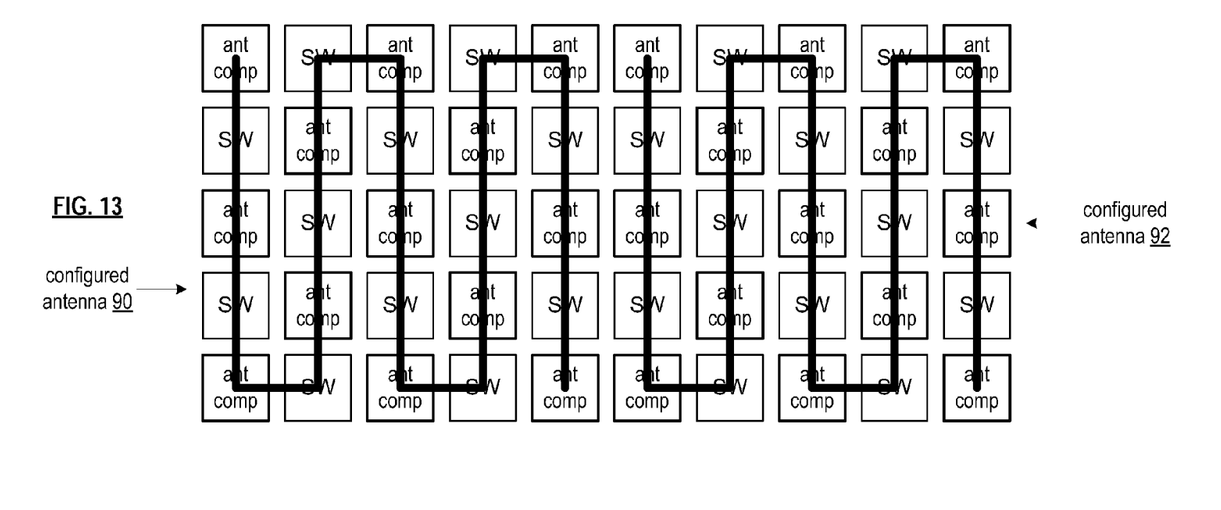
FIG. 13 is a diagram of another example of a configured antenna in accordance with the present invention.

FIG. 13 is a diagram of another example of a configured antenna that includes two meandering trace antennas 90 and 92. In this example, two meandering antennas are created of approximately the same length. One may be used for transmitting signals and the other may be used for receiving signals. Alternatively, the configured antennas 90 and 92 may have a different length (and other differing antenna properties) to transmit and/or receive signals in different frequency bands, or different channels in different frequency bands. As a further alternative, one configured antenna may have a meandering pattern while the second may have another antenna configuration (e.g., mono pole, di-pole, helical, etc.). In an implementation, the two or more configured antennas may be used in concert for beamforming and/or for a multiple input multiple output (MIMO) communication. In another implementation, the two or more configured antennas may be used to form a diversity antenna structure.

Figure 14:
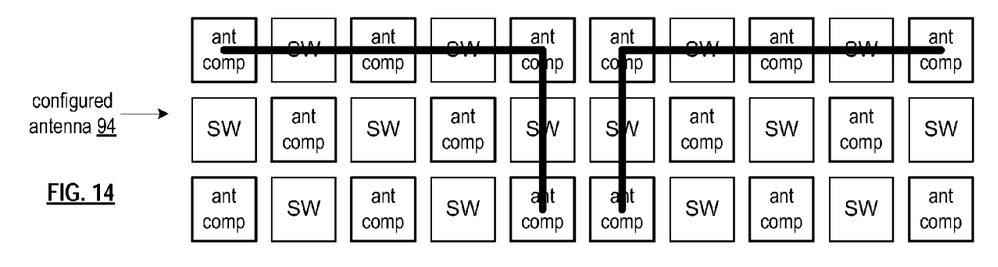
FIG. 14 is a diagram of another example of a configured antenna in accordance with the present invention.

FIG. 14 is a diagram of another example of a configured antenna 94 that has a di-pole configuration. In this example, the antenna elements are configured in a mirroring image to provide the configured di-pole antenna. The length (and potentially other properties of the antenna) of the di-pole antenna is based on the desired frequency band, or portion thereof.

Figure 15:
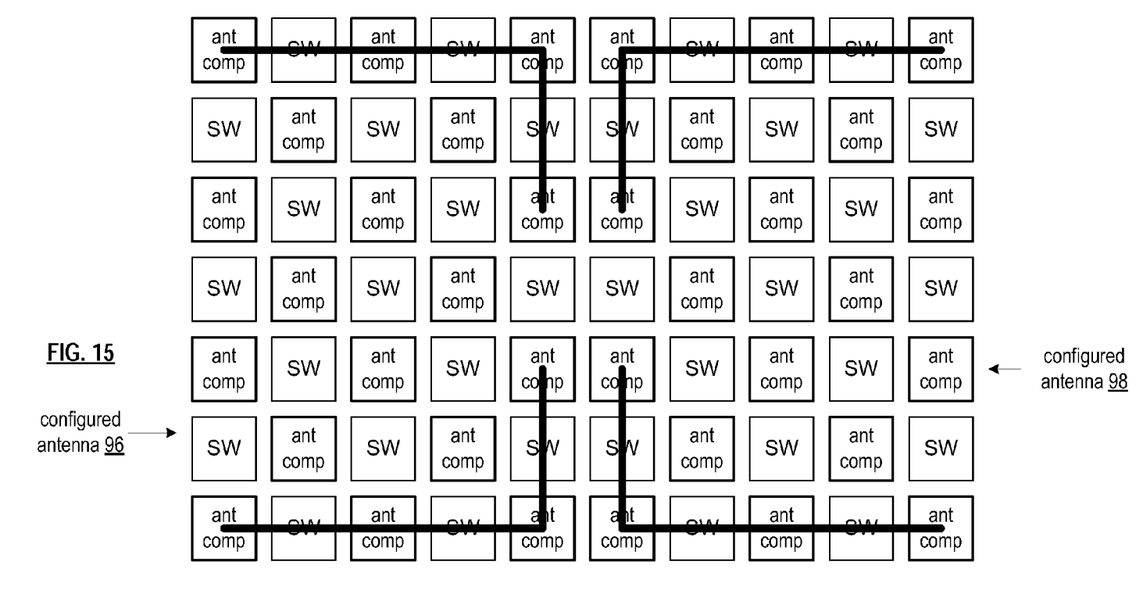
FIG. 15 is a diagram of another example of a configured antenna in accordance with the present invention.

FIG. 15 is a diagram of another example of a configured antenna that includes two di-pole antennas 96 and 98. The two configured di-pole antennas may operate in the same frequency band or different frequency bands, may be have the same or different polarization, and/or may have the same or different antenna properties. In an implementation, one antenna may be used for transmitting signals and the other for receiving signals. In another implementation, the two or more configured antennas may be used in concert for beamforming and/or for a multiple input multiple output (MIMO) communication. In yet another implementation, the two or more configured antennas may be used to form a diversity antenna structure.

Figure 16:
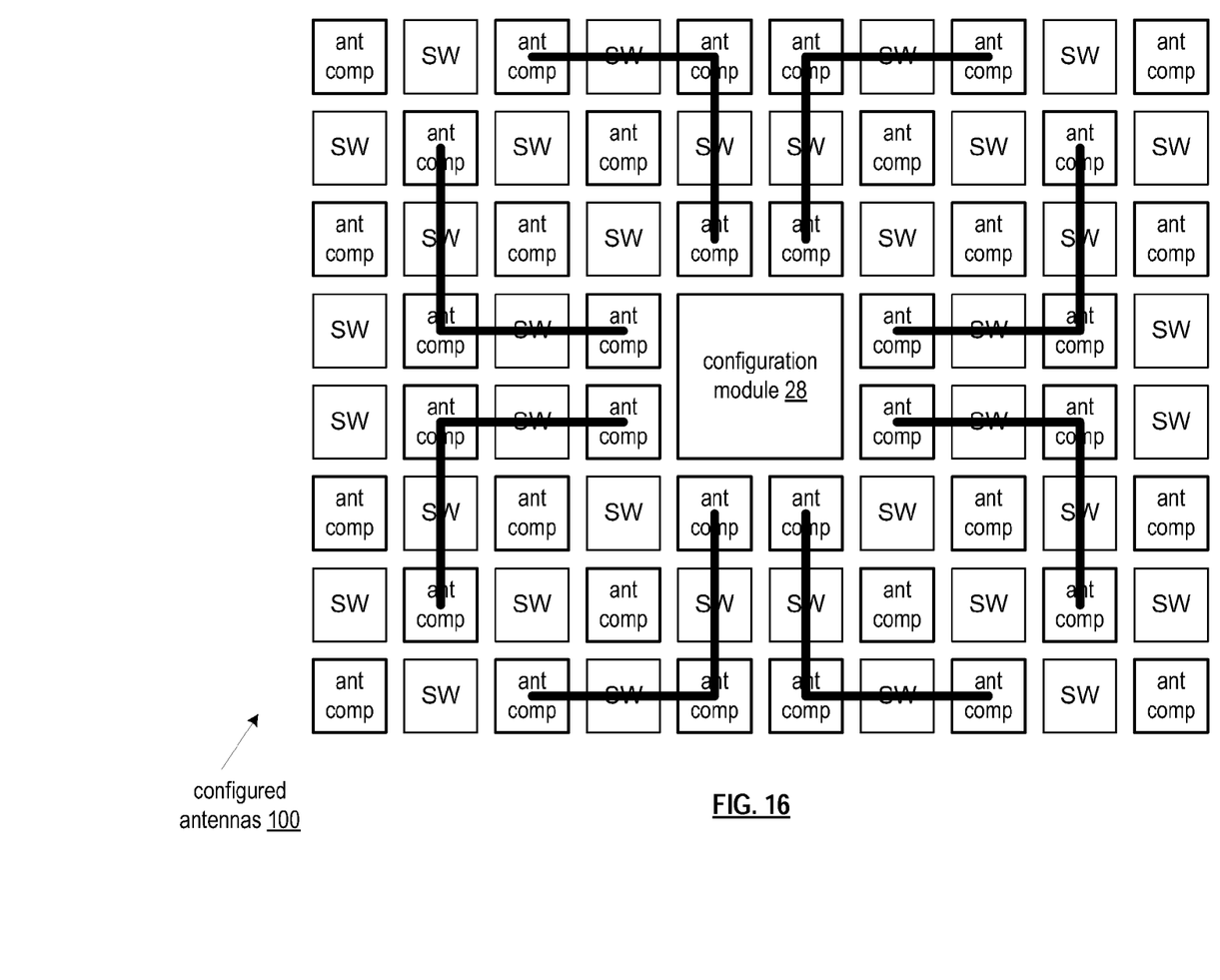
FIG. 16 is a diagram of another example of a configured antenna in accordance with the present invention.

FIG. 16 is a diagram of another example of a configured antenna 100 that includes four di-pole antennas. The four configured di-pole antennas may operate in the same frequency band or some to all may operate in different frequency bands. In an implementation, two antennas may be used for transmitting signals and the other two antennas for receiving signals. In another implementation, the configured antennas may be used in concert for beamforming and/or for a multiple input multiple output (MIMO) communication. In yet another implementation, the configured antennas may be used to form a diversity antenna structure.

Figure 17:
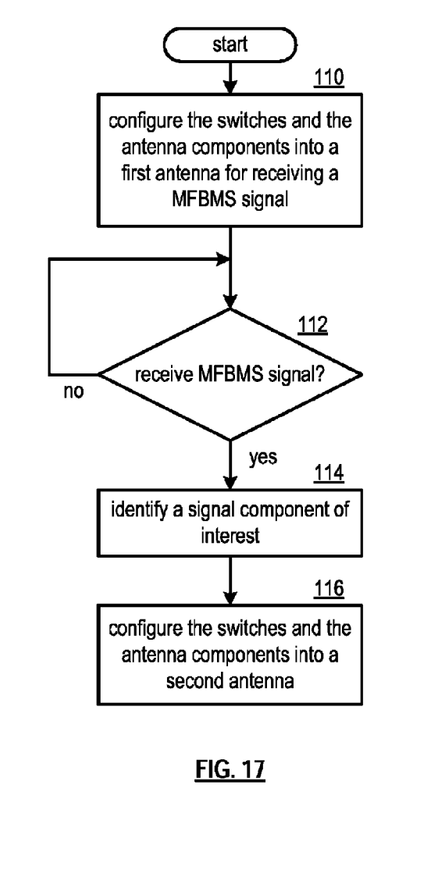
FIG. 17 is a logic diagram of an embodiment of configuring an antenna in accordance with the present invention.
Figure 18:
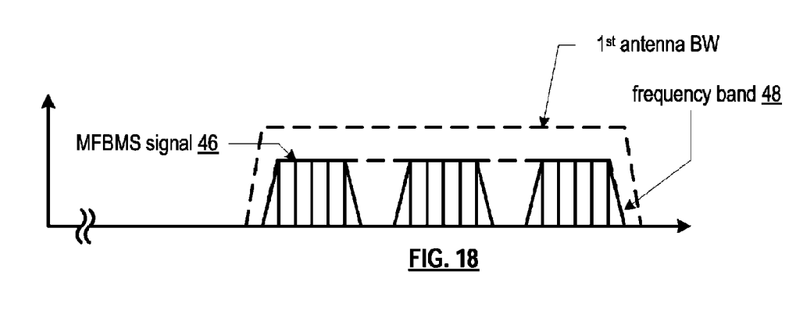
FIGS. 18-20 are diagrams of an example of configuring an antenna in accordance with the present invention.

FIG. 17 is a logic diagram of an embodiment of configuring an antenna that begins at step 110 where the configuration module configures the plurality of switches and the plurality of antenna components into a first antenna for receiving a multiple frequency band multiple standard (MFBMS) signal 46. For example, the first antenna may be configured to have a bandwidth to accommodate an MFBMS signal 46 as shown in FIG. 18. As shown, the MFBMS signal 48 spans multiple frequency bands 48 (e.g., 900 MHz, 1800 MHz, 2.4 GHz, 5 GHz, 60 GHz, etc.). Each frequency band may be divided into one or more channels, where a channel may be divided into a plurality of slots (e.g., time, frequency, and/or code slots).

Figure 19:
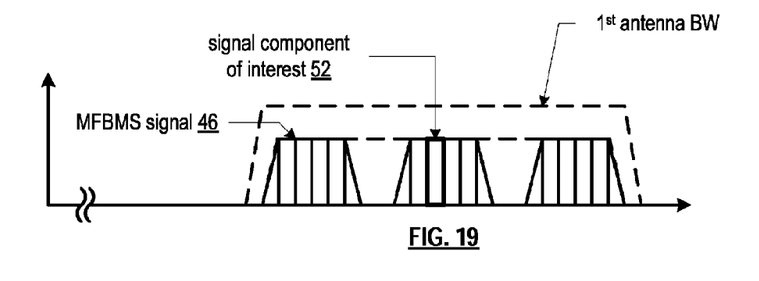

Returning to the discussion of FIG. 17, when the MFBMS signal is received, the method proceeds to step 114 where the configuration module identifies a signal component of interest of a plurality of signal components of interest within the MFBMS signal. In this example, the signal component of interest corresponds to a standard of a plurality of standards that spans a plurality of frequency bands. For example, the signal component of interest 52 may correspond to one or more channels, or portion thereof, in a given frequency band as shown in FIG. 19.

Figure 20:
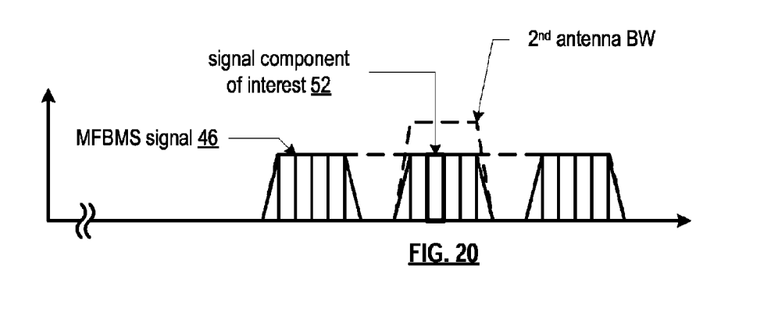

Returning to the discussion of FIG. 17, the method continues at step 116 where the configuration module configures the plurality of switches and the plurality of antenna components into a second antenna. In this example, the second antenna has at least one of: a resonant frequency corresponding to a frequency of the signal component of interest and a directional radiation pattern based on the signal component of interest. For example, the second antenna may have a bandwidth as shown in FIG. 20 to receive the signal component of interest 52.

Note that when the signal component of interest is known (e.g., for a transmission), steps 110 and 112 may be omitted such that the second antenna is configured from the plurality of antenna components and switches. Further note that the first and/or second antenna may be configured in accordance with one or more of the examples previously discussed with reference to one or more of FIGS. 1-16. Still further note that the configuration of the second antenna may configured to replace the first antenna or configured concurrently with the configured first antenna.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A configurable antenna structure comprises:
   a plurality of switches;
   a plurality of antenna components; and
   a configuration module operable to:
      configure the plurality of switches and the plurality of antenna components into a first antenna for receiving a multiple frequency band multiple standard (MFBMS) signal to correspond with a MFBMS mask that includes the MFBMS signal;
      when the MFBMS signal is received, identify a signal component of interest of a plurality of signal components of interest within the MFBMS signal, wherein the signal component of interest corresponds to a standard of a plurality of standards, and wherein the plurality of standards span a plurality of frequency bands; and
      configure the plurality of switches and the plurality of antenna components into a second antenna to correspond with a second mask that includes the signal component of interest, wherein the second antenna has at least one of: a resonant frequency corresponding to a frequency of the signal component of interest and a directional radiation pattern based on the signal component of interest and wherein a frequency band of the second mask is a subset of a frequency band of the MFBMS mask.

2. The configurable antenna structure of claim 1, wherein the configuration module is further operable to:
   reconfigure the plurality of switches and the plurality of antenna components from the first antenna into the second antenna.

3. The configurable antenna structure of claim 1, wherein the configuration module is further operable to:
   configure a first set of the plurality of switches and a first set of the plurality of antenna components into the first antenna; and
   configure a second set of the plurality of switches and a second set of the plurality of antenna components into the second antenna.

4. The configurable antenna structure of claim 3, wherein the configuration module is further operable to:
   when the MFBMS signal contains a second signal component of interest, configure the plurality of switches and the plurality of antenna components into a third antenna, wherein the third antenna has at least one of: a narrower bandwidth than the first antenna, greater gain than the first antenna, and a more directional radiation pattern than the first antenna.

5. The configurable antenna structure of claim 1, wherein the plurality of antenna components comprises at least one of:
   a plurality of antenna elements, wherein an antenna element of the plurality of antenna elements has an element frequency range, an element bandwidth, an element gain within the element bandwidth, and an element radiation pattern; and
   a plurality of phase shift elements.

6. The configurable antenna structure of claim 5, wherein the configuration module is further operable to:
   configure the plurality of switches, the plurality of antenna components, and the plurality of phase shift elements into the second antenna having a plurality of antenna members, wherein the plurality of antenna members facilitates at least one of: beamforming of the signal component of interest, multiple input multiple output (MIMO) formatting of the signal component of interest, and diversity reception of the signal component of interest.

7. The configurable antenna structure of claim 1, wherein the switch of the plurality of switches comprises at least one of:
   a micro-electro-mechanical system (MEMS) switch;
   an integrated circuit sapphire switch; and
   a silicon integrated circuit switch.

8. The configurable antenna structure of claim 1 further comprises:
   a die; and
   a package substrate, wherein the package substrate supports the die and wherein the die supports the plurality of switches, the plurality of antenna components, and the configuration module.

9. The configurable antenna structure of claim 1 further comprises:
   a die; and
   a package substrate, wherein the package substrate supports the die and the plurality of antenna components, and wherein the die supports the plurality of switches and the configuration module.

10. A configurable antenna structure comprises:
    a plurality of switches;
    a plurality of antenna components; and
    a configuration module operable to:
       configure the plurality of switches and the plurality of antenna components into an antenna that corresponds with a multiple frequency band multiple standard (MFBMS) mask;
       identify a signal component of interest of a plurality of signal components of interest, wherein the plurality of signal components of interest corresponds to a plurality of standards and are within the MFBMS mask; and
       configure the plurality of switches and the plurality of antenna components into an antenna for transmitting or receiving the signal component of interest to correspond with a second mask that includes the signal component of interest wherein a frequency band of the second mask is a subset of a frequency band of the MFBMS mask.

11. The configurable antenna structure of claim 10, wherein the configuration module is further operable to:
identify a second signal component of interest of the plurality of signal components of interest; and
configure the plurality of switches and the plurality of antenna components into the antenna for transmitting or receiving the signal component of interest and into a second antenna for transmitting or receiving the second signal component of interest.

12. The configurable antenna structure of claim 10, wherein the plurality of antenna components comprises at least one of:
a plurality of antenna elements, wherein an antenna element of the plurality of antenna elements has an element frequency range, an element bandwidth, an element gain within the element bandwidth, and an element radiation pattern; and
a plurality of phase shift elements.

13. The configurable antenna structure of claim 12, wherein the configuration module is further operable to:
configure the plurality of switches, the plurality of antenna components, and the plurality of phase shift elements into the antenna having a plurality of antenna members, wherein the plurality of antenna members facilitates at least one of: beamforming of the signal component of interest, multiple input multiple output (MIMO) formatting of the signal component of interest, and diversity reception of the signal component of interest.

14. The configurable antenna structure of claim 10, wherein the switch of the plurality of switches comprises at least one of:
a micro-electro-mechanical system (MEMS) switch;
an integrated circuit sapphire switch; and
a silicon integrated circuit switch.

15. The configurable antenna structure of claim 10 further comprises:
a die; and
a package substrate, wherein the package substrate supports the die and wherein the die supports the plurality of switches, the plurality of antenna components, and the configuration module.

16. The configurable antenna structure of claim 10 further comprises:
a die; and
a package substrate, wherein the package substrate supports the die and the plurality of antenna components, and wherein the die supports the plurality of switches and the configuration module.

17. A radio frequency (RF) transceiver comprises:
a configurable antenna structure that includes:
a plurality of switches;
a plurality of antenna components; and
a configuration module operable to:
configure the plurality of switches and the plurality of antenna components into a first antenna for receiving a multiple frequency band multiple standard (MFBMS) signal to correspond with a first mask that includes the MFBMS signal;
when the MFBMS signal is received, identify a signal component of interest of a plurality of signal components of interest, wherein the plurality of signal components corresponds to a plurality of standards and are within a multiple frequency band multiple standard (MFBMS) mask; and
configure the plurality of switches and the plurality of antenna components into an antenna for transmitting or receiving the signal component of interest to produce a transmit signal component of interest or a received signal component of interest that corresponds to a second mask wherein the second mask corresponds to a frequency band that is a portion of a frequency band of the MFBMS mask;
a low noise amplifier operable to amplify the received signal component of interest to produce an amplified received signal component of interest;
a down conversion module coupled to convert the amplified received signal component of interest into an inbound symbol stream in accordance with a corresponding standard of the plurality of standards;
an up conversion module coupled to convert an outbound symbol stream into an up converted signal in accordance with the corresponding standard; and
a power amplifier coupled to amplify the up converted signal to produce the transmit signal component of interest.

18. The RF transceiver of claim 17, wherein the configuration module is further operable to:
identify a second signal component of interest of the plurality of signal components of interest; and
configure the plurality of switches and the plurality of antenna components into the antenna for transmitting or receiving the signal component of interest and into a second antenna for transmitting or receiving the second signal component of interest.

19. The RF transceiver of claim 17, wherein the plurality of antenna components comprises at least one of:
a plurality of antenna elements, wherein an antenna element of the plurality of antenna elements has an element frequency range, an element bandwidth, an element gain within the element bandwidth, and an element radiation pattern; and
a plurality of phase shift elements.

20. The RF transceiver of claim 19, wherein the configuration module is further operable to:
configure the plurality of switches, the plurality of antenna components, and the plurality of phase shift elements into the antenna having a plurality of antenna members, wherein the plurality of antenna members facilitates at least one of: beamforming of the signal component of interest, multiple input multiple output (MIMO) formatting of the signal component of interest, and diversity reception of the signal component of interest.

21. The RF transceiver of claim 17, wherein the switch of the plurality of switches comprises at least one of:
a micro-electro-mechanical system (MEMS) switch;
an integrated circuit sapphire switch; and
a silicon integrated circuit switch.

22. The RF transceiver of claim 17 further comprises:
a die; and
a package substrate, wherein the package substrate supports the die and wherein the die supports the plurality of switches, the plurality of antenna components, and the configuration module.

23. The RF transceiver of claim 17 further comprises:
a die; and
a package substrate, wherein the package substrate supports the die and the plurality of antenna components, and wherein the die supports the plurality of switches and the configuration module.

* * * * *